United States Patent
Duesterberg et al.

(10) Patent No.: US 6,969,205 B2
(45) Date of Patent: Nov. 29, 2005

(54) OPTICAL FIBER PIGTAIL ASSEMBLY

(75) Inventors: Richard L. Duesterberg, Mountain View, CA (US); Edmund L. Wolak, Palo Alto, CA (US); Marc K. Von Gunten, Los Altos, CA (US); Nina Morozova, San Jose, CA (US); Donald C. Hargreaves, Sidney (CA); Prasad Yalamanchili, Santa Clara, CA (US); Hilary Clarke, Milpitas, CA (US); Jay A. Skidmore, San Jose, CA (US); Lei Xu, Milpitas, CA (US); Christopher L. Hart, West Melbourne, FL (US); William Bardy, Palm Bay, FL (US); Jeffrey Zack, Melbourne, FL (US); Kuochou Tai, Fremont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 46 days.

(21) Appl. No.: 10/727,735

(22) Filed: Dec. 4, 2003

(65) Prior Publication Data
US 2005/0074217 A1 Apr. 7, 2005

Related U.S. Application Data

(60) Provisional application No. 60/431,461, filed on Dec. 6, 2002.

(51) Int. Cl.$^7$ .............................. G02B 6/42; G02B 6/02
(52) U.S. Cl. ........................................ 385/94; 385/128
(58) Field of Search ............................ 385/88–94, 123, 385/128

(56) References Cited

U.S. PATENT DOCUMENTS

| | | | |
|---|---|---|---|
| 5,241,614 A * | 8/1993 | Ecker et al. ................... | 385/94 |
| 6,146,025 A | 11/2000 | Abbink et al. ................ | 385/88 |
| 6,608,959 B2 * | 8/2003 | Jang et al. .................... | 385/136 |
| 6,776,538 B2 * | 8/2004 | Whitney et al. ............... | 385/94 |
| 6,798,963 B2 * | 9/2004 | Nemirovsky et al. ........ | 385/128 |

* cited by examiner

*Primary Examiner*—Sarah Song
(74) *Attorney, Agent, or Firm*—Allen, Dyer, Doppelt, Milbrath & Gilchrist, P.A.

(57) ABSTRACT

A fiber tail assembly (FTA) with a micro-lens formed in the fiber tip is used to couple the laser light out of the package and along the fiber. The FTA is soldered at two points where metallized bands are deposited on the fiber pigtail, one at a fiber mount near the diode where it can be soldered into alignment with the laser diode, and two at the snout which forms a feed through the housing and seal for the package. Typically, the FTA is metallized along its entire length within the package. In this invention the two-metallized bands are separated by a region that is unmetallized.

2 Claims, 3 Drawing Sheets

OPTICAL FIBER PIGTAIL ASSEMBLY

CROSS-REFERENCE TO RELATED APPLICATIONS

The present invention claims priority from U.S. patent application No. 60/431,461 filed Dec. 6, 2002, entitled "Methods to Minimize Heating of Fiber Metal in High Power Optoelectronic modules by Reducing Light Absorption", which is incorporated herein by reference for all purposes.

FIELD OF INVENTION

This invention relates generally to optical coupling devices. More specifically, the invention relates to an improved method and apparatus for coupling one or more optical signals between an optoelectronic device such as a laser diode and an optical fiber.

BACKGROUND OF THE INVENTION

One of the most important considerations in designing an optoelectronic system is the connection between circuit components such as integrated circuits or optoelectronic devices with purely optical components such as waveguides. Sometimes, connections are needed between a first component mounted upon a printed circuit board and a second component located on the same board or on another board. Occasionally, connection is desired between a component mounted upon a printed circuit board and a connector located at the edge of the same board.

One type of connector that is presently utilized to connect optoelectronic devices to optical fiber is called an optical fiber "pigtail" connector. A fiber pigtail is a length of optical fiber, generally having a portion of its buffer coating removed and often coated with a metallized coating. Such pigtail connectors or couplings can optically couple an optical fiber or lensed optical fiber with light-producing or light-detecting elements coupled to leads of the integrated circuit. The light-producing element, for example, can be a semiconductor or diode laser, or a light-detecting element could be a photodiode. These elements are typically coupled with and fixedly disposed and oriented to an end of the lensed optical fiber, which is located in such a manner as to reside within the housing often forming a hermetic seal therewith. The lensed or collimating fiber extends beyond the edge of the housing and into it carrying signals to and/or from the integrated circuit. Mounting the fiber pigtail to the housing is not a trivial procedure. For example, alignment of a laser diode mounted within the housing with a lensed end of the fiber pigtail must be such that maximum coupling of light exist from a laser to the fiber. Furthermore, the coupling must be robust maintaining optimum alignment and coupling over time and often through changes in temperature and humidity. This coupling should preferably be tolerant of being handled or even dropped.

One common method of forming a relatively secure fixed connection between an optoelectronic component such as a photodiode and an optical fiber within a same package is to coat a length about an end of an optical fiber pigtail with metal so that it can more easily be soldered into position to metal pads within a housing. For example, U.S. Pat. No. 6,146,025 discloses a package wherein an end of an optical fiber is stripped down to the cladding having a portion of the outer jacket removed and wherein the stripped clad portion is metallized before being soldered to provide a strong bond with the solder. Heretofore, it is customary to fabricate fiber pigtails that are to be soldered, by pre-stripping the outer jacket and metallizing the entire end, often including a portion of the jacket about the stripped end. This is shown more clearly in FIG. 1 wherein an optical fiber 20 has a stripped portion 22 coated in a thin layer of metal 24 to be soldered to solder pads 26 within a housing.

One problem with arrangement, is that the solder joints and the fiber can be damaged due to unwanted heating of the fiber from the laser light, leading to a thermally induced reliability problems. Absorption of high power cladding light by the fiber metal can cause the fiber metal to overheat in a region of the fiber in which there is a minimal thermally conductive path for heat dissipation; this typically occurs between the fiber mount and or the region about the opening in the package where the fiber is soldered and the region therebetween. The thermal resistance of a fiber is very high, and the thin metal layers normally used with metallized fiber have high thermal resistance as well. As a result the fiber metal may reach temperatures that can cause the metal to oxidize, or form undesirable alloys among the different materials within the coating. The metal may crack, interrupting the conductive thermal path and resulting in additional overheating. In the worst case the fiber may crack resulting in the failure of the device.

Furthermore, this absorption can also cause localized heating of solder used to bond the metallized fiber to an alignment structure or to a welding ferrule. Localized heating within the fiber and solder may result in fiber alignment shifts from plastic solder yielding because of local thermal stress variations, the redistribution of residual stresses, and creep deformation in the solder. An alignment shift will cause decoupling of light energy from the fiber core and an increase in cladding mode energy, resulting in a thermal runaway situation, with eventual total loss of coupled power.

It is an object of this invention, to provide a fiber pigtail for physically bonding to a laser package and optically coupling with a diode laser that lessens the problems described heretofore with conventional stripped and metallized fibers for soldering in high power laser packages.

In accordance with the invention, there is provided, an optical fiber pigtail assembly comprising a span of optical fiber, having an end for receiving light from a laser to be optically coupled therewith, wherein a first region of said optical fiber about th e end is metallized for soldering in a fixed position relative to said laser and wherein a second region of the optical fiber downstream and spaced from the first region is metallized for further fixedly mounting said fiber tail assembly relative to said laser, and wherein an other region of said optical fiber between said first region and said second region is absent metallization to minimize heating of said optical fiber when high intensity light propagates therethrough.

In accordance with another aspect of the invention, there is provided, a method of fabricating an optical fiber pigtail assembly comprising the steps of:

fixedly providing a laser diode within a housing in a predetermined orientation;

stripping a portion of an optical fiber to provide an optical fiber pigtail;

coating to metallize at least two separate regions of the optical pigtail so as to leave an uncoated region there between, the uncoated region being substantially larger than each of the coated regions;

grasping the pigtail end with tweezers having non-metallic grasping ends;

placing the optical fiber pigtail in the housing such that an end of the pigtail is oriented to couple light from the laser diode; and, soldering the at least two metallized regions to solder pads within the housing.

In accordance with another aspect of the invention, there is further provided, An optical fiber pigtail assembly comprising:
  a) a laser diode disposed within a housing; and,
  b) an optical fiber pigtail at least partially disposed within an opening of said housing, said optical fiber pigtail having an end including a lens for coupling light there into from the laser diode, the optical fiber pigtail having a first region about the end that is metallized and soldered fixedly with respect to said housing, the optical fiber pigtail having a second metallized region spaced from the first region by an other region wherein the second region is soldered to the housing about the opening to provide a seal therewith, said other region being absent of metal to less en heating that may otherwise occur in the presence of a high intensity light from the laser passing therethrough.

BRIEF DESCRIPTION OF THE DRAWINGS

Exemplary embodiments of the invention will now be described in conjunction with the drawings in which.

DETAILED DESCRIPTION

Figure 1:
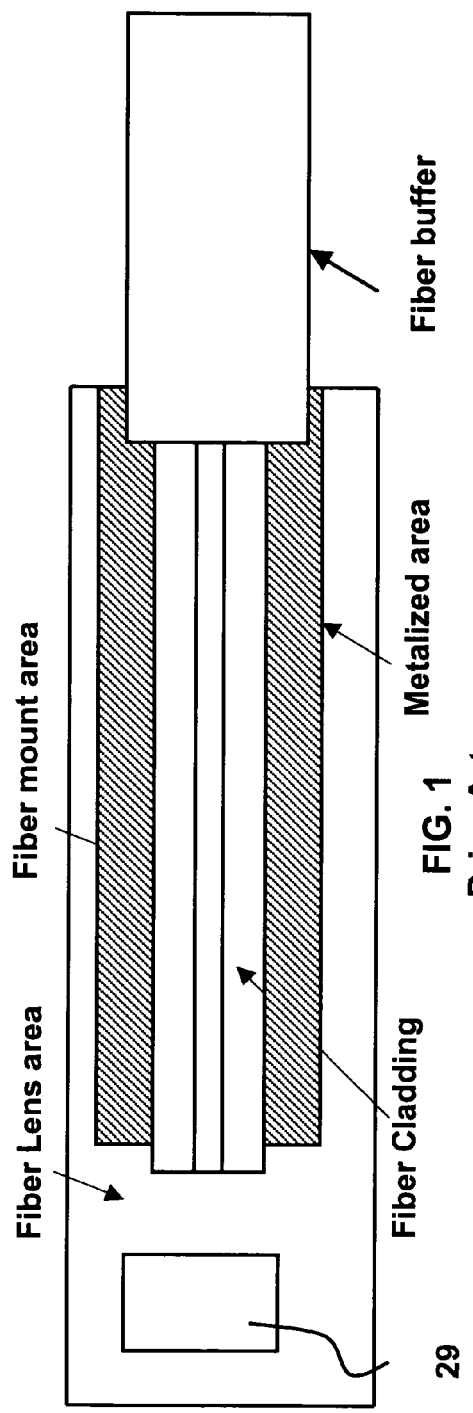
FIG. 1 is a prior art diagram illustrating a typical metallized fiber pigtail soldered within a laser package for receiving light from a laser diode and for guiding the light along the fiber.
Figure 2:
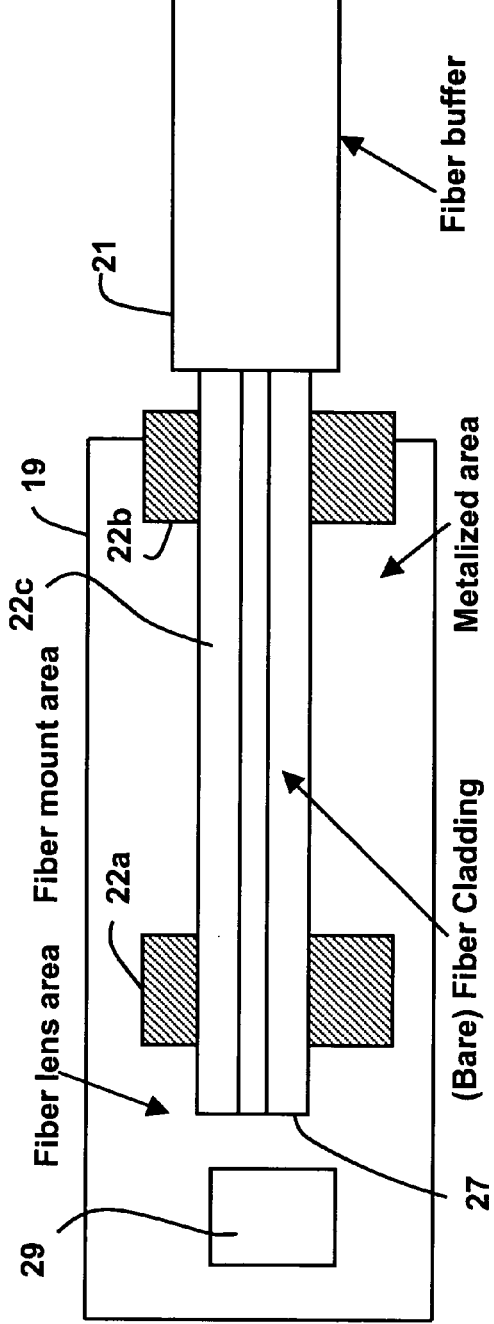
FIG. 2 is a top view of a first embodiment of the invention wherein buffer stripped portion of a fiber pigtail is shown having two metallized bands surrounding first and second regions of the fiber, spaced by an unmetallized region within the a housing forming a laser package.

Turning now to FIG. 2, a pigtail fiber is shown having its buffer layer 21 stripped away from an end thereof for placement into the housing 19. The stripped portion is coated with two rings of metal 22a and 22b are shown only at locations where the pigtail fiber is to be bonded by soldering to metal pads (not shown) on a substrate within the housing. The region 22c between 22a and 22b is intentionally absent any metallization so that little or no absorption or heating will occur this region. Specifically, two bands of metallization are made, one for the critical alignment soldering joint and one for the hermetic snout seal about the opening in the package. A microlens 27 is formed in the end of the pigtail fiber closest to the laser diode 29. Alternatively, the core of the optical fiber end of the fiber pigtail may be thermally expanded to enhance coupling of light from the laser diode to the fiber. Although it is preferable to have the lens formed in the end of the optical fiber, a separate lens can be disposed between the fiber pigtail and the laser diode 29. Care should be taken when handling the fiber to prevent breakage and to lessen cracks; this is particularly important when handling the non-soldered region 22c. In one embodiment of this invention, special tweezers having graphite or other non-metallic grasping ends are provided for handling the fiber pigtail. In yet another embodiment, a getter is disposed within the housing to reduce moisture about the fiber and to reduce lessen the chance of crack propagation.

Figure 3:
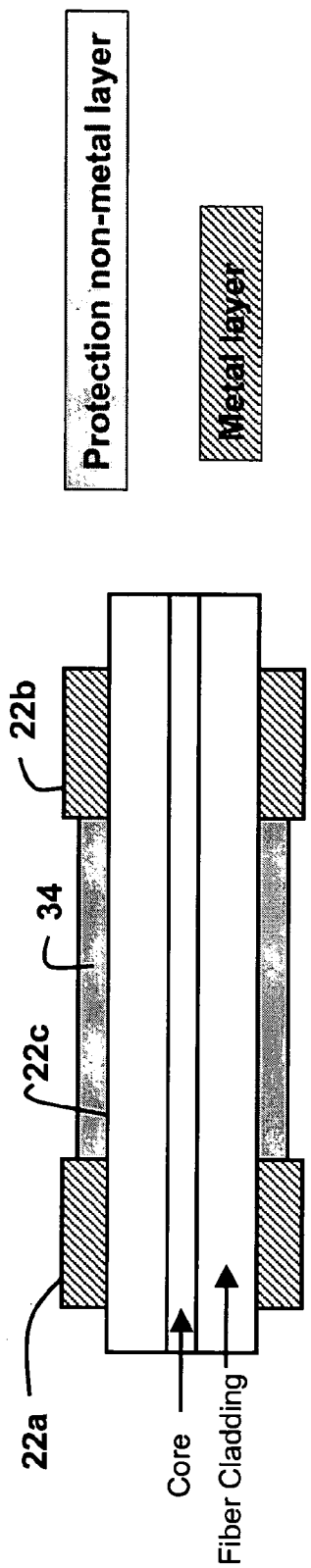
FIG. 3 is a top view of a second embodiment of the invention wherein the unmetallized region shown in FIG. 2 is coated with a protective coating to prevent damage while handling.

FIG. 3 shows an alternative embodiment of the invention wherein the region 22c disposed between 22a and 22b is coated with a coating 34 such as an inorganic transparent dielectric coating to protect the fiber pigtail from damage during handling.

Figure 4:
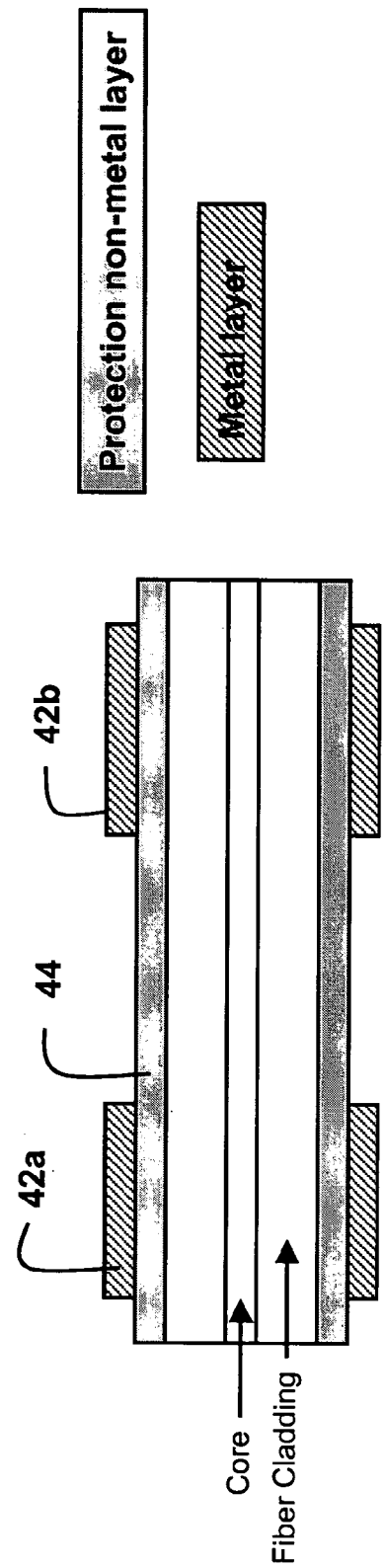
FIG. 4 is a top view of a third embodiment of the invention wherein the entire buffer stripped fiber pigtail is precoated with a protective coating prior to the two regions being metallized.

FIG. 4 illustrates an embodiment of the invention where the entire buffer stripped portion of the fiber pigtail is first coated with a protective coating 44 prior to the two bands 42a and 42b.

In all of the above embodiments the metallization regions or bands are disposed at locations such that the fiber pigtail including the metallized regions are within a laser diode housing as is shown in FIG. 2. Conveniently and preferably, a first band is disposed near to an end of the pigtail adjacent the lens on the fiber and the second band is disposed at a location that will align with the snout or opening of the housing, to form a hermetic seal therewith, when soldered into place. In all of the embodiments of the this invention, an unmetalized region is disposed between the two metallized bands, and preferably, the metallized bands are as small as allowable to form an adequate bond when soldered.

Figure 5:
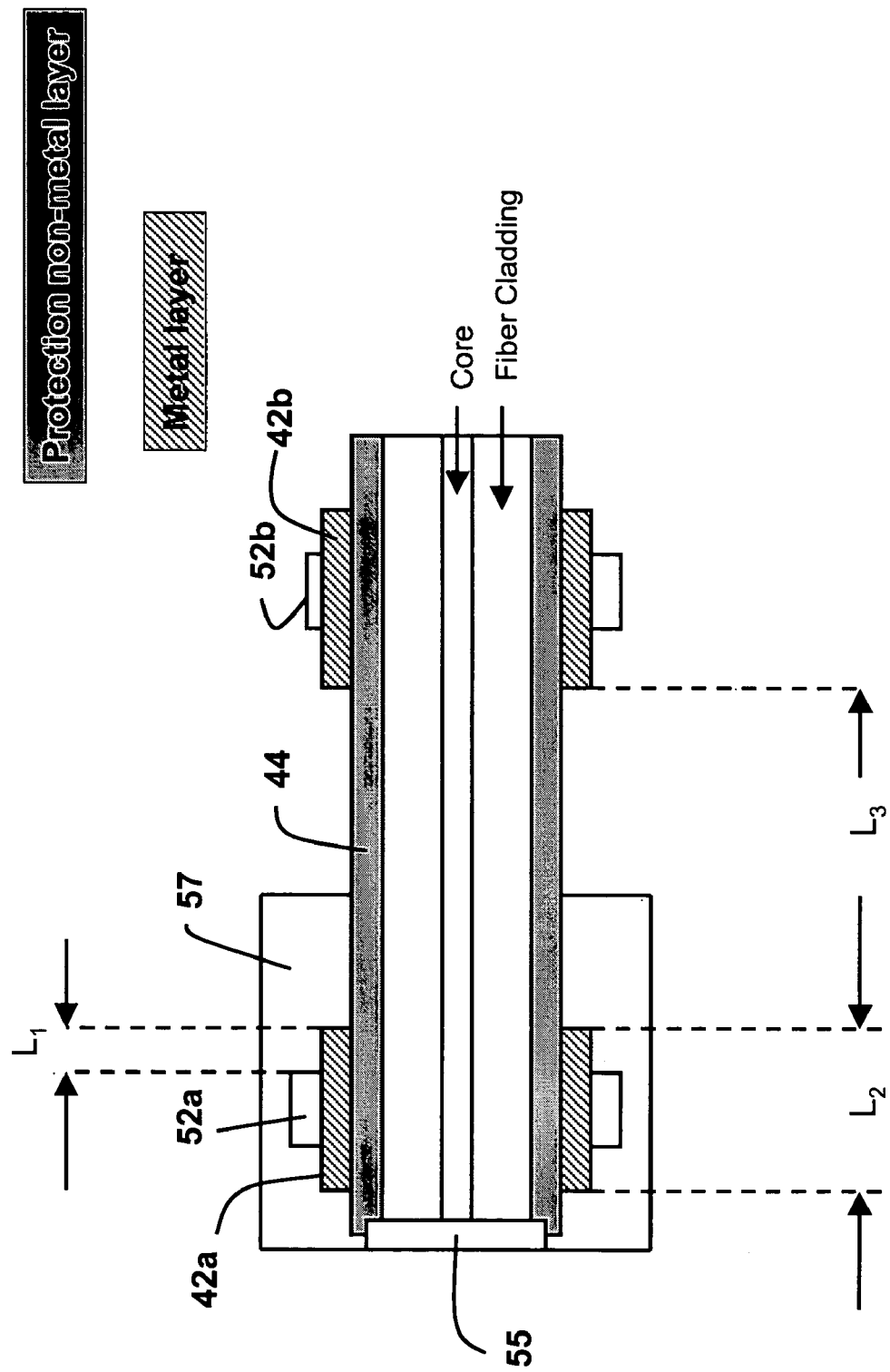
FIG. 5 is a top view of the fiber pigtail assembly shown in FIG. 4 soldered to bonding pads.

It is also preferable that a large portion of the metallized band be soldered since the soldered metallized region of the fiber provides a greater ability than the unsoldered metallized portion to conduct heat away from the fiber. Referring now to FIG. 5, a fiber pigtail is shown wherein the metallized region or band 42a closest to a lens 55 at the fiber end is soldered to a bonding pad 52a on a platform 57 within a package not shown. Although it is preferred to have as little metallized fiber as possible not soldered, in some instances it is difficult to control precisely for this. For example, fiber pigtails manufactured in accordance with this invention, may be provided from one vendor, and packages to house the fiber pigtails may come from a different vendor and specified lengths may not match. Tests have shown that if the length L of a metallized region is not soldered damage can occur if the metallized unsoldered region is substantially greater than 0.5 mm. In most practicable instances where only two metallized regions are provided on a single fiber pigtail, for example for use in a laser diode package, where the snout and a region about an end are to be soldered, as in FIG. 5, the ratio of lengths of a banded metallized region 42a, or 42b, to the unmetallized region 44, i.e. L2:L3 is approximately greater than 1:3 and in some instances is 1:8 or more. In general as small a metallized region as possible should be provided while not jeopardizing a good solder bond, and as much of the length of the metallized region as possible should be soldered to prevent heat build up about the metallized region.

Verification of the invention shown in FIG. 2 was made by way of a 14-pin butterfly packages using a multi-mode 915 nm laser source. The laser diode was mounted on a sub-mount and tested as a chip on a sub-mount (COS). The housing included a patterned ceramic, which allows for electrical routing; these metal patterns were connected to the package pins by wirebonds. Subsequently the COS was fixed within the housing by soldering and electrically connected to the patterned metal by wire bonding. The multimode fiber pigtail assembly was metallized in two regions as shown, with the two bands of metal corresponding to the location for critical alignment and snout seal solder joints. The metallized bands of the fiber were soldered to fix the alignment between the fiber lens and the laser diode, and the second region was soldered about the snout of the package to form a seal.

The resulting package was optically and thermally characterized. The heating typically observed in the suspended section between the alignment joint and the snout no longer occurred in this embodiment, and any heating of the fiber pigtail assembly where metal protrudes from the solder joints was within acceptable levels.

In contrast a typical package, with a fully metallized fiber pigtail had unacceptably high levels of heating; and, failures due to this fully metallized pigtail has been observed.

Conventional techniques such vacuum metallization can be used to coat two rings of metal about the buffer stripped optical fiber pigtail. Although it is more costly and labor intensive, a mask can be employed to ensure that the region between the two-coated regions of optical fiber remains devoid of metal deposited thereon.

Metal layers used in optical fiber metallization often consist of nickel and gold. The metallization sequence relative to the glass optical fiber is nickel followed by gold. Preferred coating materials are, Al, Cu, Au, and Ag as opposed to Pd, Ni, and Ti all of which have a significantly lower reflectance.

Of course, numerous other embodiments may be envisaged without departing from the spirit and scope of the invention. For example, the invention can be used with a single mode fiber or alternatively with multimode fibers.

What is claimed is:

1. An optical fiber pigtail assembly comprising:

a) a laser disposed within a housing; and, b) an optical fiber pigtail comprised of an optical fiber disposed within an opening of said housing, said optical fiber pigtail having an end for coupling light there into from the laser diode, the optical fiber pigtail having a first region about the end that is metallized and soldered fixedly with respect to said housing, the optical fiber pigtail having a second metallized region spaced from the first region by an other region wherein the second region is soldered to the housing about the opening to provide a seal therewith, said other region being absent of metal to lessen heating that may otherwise occur in the presence of a high intensity light from the laser passing therethrough, wherein the first metallized region along an optical axis of the fiber pigtail is of length $L_1$ and wherein no more than 0.5 mm of length of the first metallized region on either side of a solder joint is unsoldered.

2. An optical fiber pigtail assembly as defined in claim 1 wherein a portion of the first region soldered to one or more solder pads has an unsoldered metallized portion extending from the solder and wherein the unsoldered metallized portion is less or equal to 0.5 mm, and wherein the second metallized region along the optical axis of the fiber pigtail is of length $L_2$ and wherein no more than 0.5 mm of length of the second metallized region on either side of a solder joint is unsoldered.

* * * * *